June 5, 1928.
E. J. LAMOTHE
BARREL TRUCK
Filed July 9, 1927
1,672,130
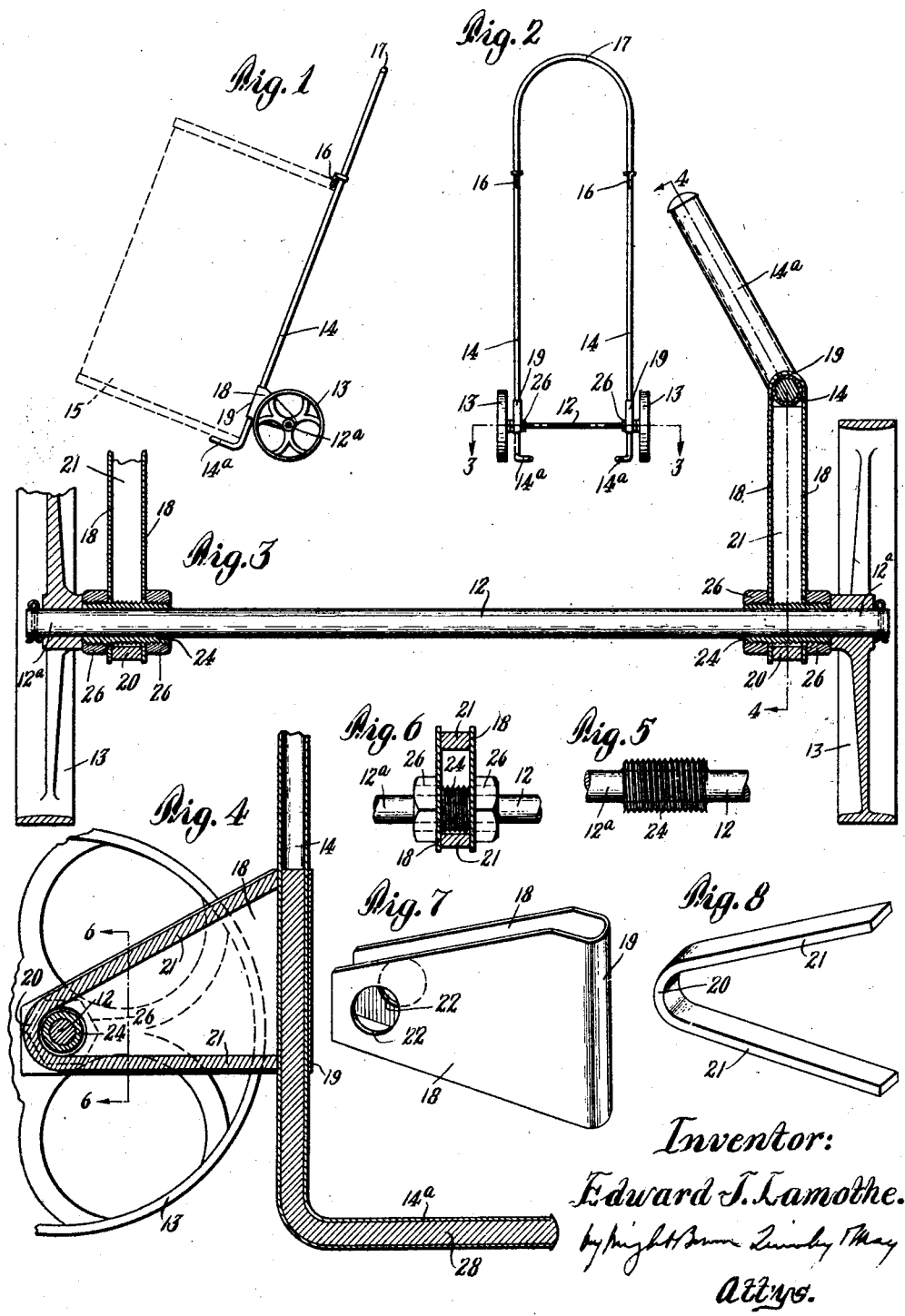
Inventor:
Edward J. Lamothe.
attys.

Patented June 5, 1928.

1,672,130

UNITED STATES PATENT OFFICE.

EDWARD J. LAMOTHE, OF NEWTON, MASSACHUSETTS.

BARREL TRUCK.

Application filed July 9, 1927. Serial No. 204,457.

This invention relates chiefly to trucks adapted for use in conveying ash barrels from a building to a sidewalk, preparatory to removal of their contents by a collector. The object is to provide a truck of relatively light weight and of simple, strong, durable, and relatively inexpensive construction.

Of the accompanying drawings forming a part of this specification,—

Figure 1 is an edge view of my improved truck, and shows by dotted lines an ash barrel thereon.

Figure 2 is a side view, looking toward the front side of the truck.

Figure 3 is a section on a larger scale, on line 3—3 of Figure 2.

Figure 4 is a section on line 4—4 of Figure 3.

Figure 5 is a fragmentary side view, showing a portion of the axle bar and one of the sleeves thereon hereinafter described.

Figure 6 is a section on line 6—6 of Figure 4.

Figures 7 and 8 show separately and in perspective one of the frame-supporting standards hereinafter described, and a reinforcing member associated therewith.

The same reference characters indicate the same parts in all of the figures.

12 designates an axle bar, preferably cylindrical from end to end, the end portions 12ª of the bar constituting stub axles supported by traction wheels 13. The barrel-supporting frame of the truck includes substantially parallel spaced apart frame bars 14, having bent lower end portions 14ª constituting rests for the bottom of a barrel 15, the body of which bears on the frame bars and may be releasably confined thereagainst by hooks 16, slidable on the frame bars. The frame may include a neck 17, connecting the bars 14, the neck, the bars 14, and the barrel rests 14ª being preferably made of a single length of steel tubing, the end portions of which may be reinforced by plugs 28 (Figure 4) driven therein.

The frame is connected with and offset from the axle bar 12, by standards, the preferred construction of which is as next described. Each standard is formed by bending a sheet metal blank to the U-shape shown by Figure 7, the standard including spaced apart arms 18 and a neck 19 connecting the arms. The arms 18 are provided with orifices 22 in which the axle bar is inserted. A reinforcing member shown by Figure 8, and including a neck 20 and arms 21, is interposed between the standard arms and fixed thereto, preferably by electric welding.

The neck 20 partially surrounds the axle bar and the ends of the arms 21 are abutted against, and preferably welded to the frame bar 14. The reinforcing member therefore maintains the arms 18 spaced apart and renders the standard strong and rigid.

The standard thus constructed and applied is of light weight, the described construction permitting the employment of sheet metal about one-sixteenth of an inch thick for the standard, and a narrow metal strip of considerably greater thickness for the reinforcing member.

The truck comprises clamping means supported by the axle bar 12, and confining the standard against sidewise movement thereon, said means being preferably embodied in an externally screw-threaded sleeve 24 (Figure 5) fixed to the axle bar, preferably by electric welding, and clamping nuts 26, engaged with the end portions of the sleeve and set up against opposite sides of the standard, as shown by Figure 3, the orifices 22 being of sufficient size to receive the sleeve 24, and the reinforcing neck 20 being formed to partially surround the sleeve, as shown by Figure 4.

It is obvious that the described clamping means may be employed to laterally confine a standard otherwise constructed, and that a standard of the described construction may be otherwise laterally confined on the axle bar.

I claim:

1. A barrel truck comprising an axle bar whose opposite end portions constitute stub axles supported by traction wheels, a barrel-supporting frame having spaced apart longitudinal frame bars, sheet metal frame-supporting standards formed to offset the frame from the axle bar, and including necks fixed to portions of the frame bars, and arms connected by the necks and having orifices through which portions of the axle bar extend, reinforcing members fixed to the standards and spacing the arms thereof apart, said reinforcing members including necks partially surrounding the axle bar, and arms bearing on and fixed to the frame bars, and clamping means associated with the axle bar and engaging opposite sides of the standards.

2. A barrel truck comprising an axle bar whose opposite end portions constitute stub axles supported by traction wheels, a barrel-supporting frame having spaced apart longitudinal frame bars, frame-supporting standards formed to offset the frame from the axle bar and fixed at their outer ends to portions of the frame bars, the inner ends of the standards having orifices through which portions of the axle bar extend, and clamping means embodied in externally threaded sleeves fixed to the axle bar and extending through the standard orifices, and clamping nuts engaged with the sleeves and bearing on opposite sides of the standards.

In testimony whereof I have affixed my signature.

EDWARD J. LAMOTHE.